United States Patent [19]

Peters

[11] Patent Number: 5,320,721

[45] Date of Patent: Jun. 14, 1994

[54] SHAPED-TUBE ELECTROLYTIC POLISHING PROCESS

[75] Inventor: W. Neil Peters, Corning, N.Y.

[73] Assignee: Corning Incorporated, Corning, N.Y.

[21] Appl. No.: 6,038

[22] Filed: Jan. 19, 1993

[51] Int. Cl.⁵ ................. C25F 3/16; B23H 9/14
[52] U.S. Cl. ................. 204/129.1; 204/129.43; 204/129.55; 204/129.75
[58] Field of Search ........... 204/129.5, 129.55, 129.1, 204/284, 129.43, 129.75

[56] References Cited

U.S. PATENT DOCUMENTS

| | | | |
|---|---|---|---|
| 3,058,895 | 10/1962 | Williams | 204/129.5 |
| 3,290,237 | 12/1966 | Abt et al. | 204/284 |
| 3,336,213 | 8/1967 | Auger et al. | 204/284 X |
| 3,352,770 | 11/1967 | Crawford et al. | 204/129.7 |
| 3,352,958 | 11/1967 | Andrews | 264/255 |
| 3,427,239 | 2/1969 | Abt et al. | 204/284 |
| 3,793,169 | 2/1974 | Joslin | 204/129.55 |
| 3,801,489 | 4/1974 | Samson | 204/129.55 X |
| 3,803,015 | 4/1974 | Andrews | 204/224 M |
| 4,088,557 | 5/1978 | Andrews | 204/224 M |
| 4,687,563 | 8/1987 | Hayes | 204/224 M |

FOREIGN PATENT DOCUMENTS 0245545 12/1986 European Pat. Off. .

OTHER PUBLICATIONS

*Machining Data Book*, vol. 2, pp. 11-71 to 11-75 (3rd ed. 1980).
E. J. Weller, *Nontraditional Machining Processes*, pp. 109-113 (2nd ed. 1984).
G. F. Benedict, *Nontraditional Manufacturing Processes*, pp. 181-187 (1987).

Primary Examiner—Donald R. Valentine
Attorney, Agent, or Firm—Michael L. Goldman; Kees van der Sterre

[57] ABSTRACT

The present invention is directed to a shaped-tube electrolytic polishing process which involves providing a workpiece with at least one hole. The hole is polished by advancing a metal tube electrode through the hole while passing an electrolyte through the tube and into the hole and while passing electric current between the metal tube and the workpiece through the electrolyte. As a result of such polishing, reduced surface roughness is imparted to the hole. It is particularly desirable to provide the hole in the workpiece by a shaped-tube electrolytic drilling process.

20 Claims, 3 Drawing Sheets

SHAPED-TUBE ELECTROLYTIC POLISHING PROCESS

FIELD OF THE INVENTION

The present invention relates to a shaped-tube electrolytic machining process.

BACKGROUND OF THE INVENTION

Electrochemical machining is a widely used technique for providing holes in difficult-to-machine metal parts. Generally, these processes involve using electrochemical force (as opposed to mechanical force) to disengage or deplate material from a workpiece.

A highly specialized adaptation of electrochemical machining, known as shaped-tube electrolytic machining, is used for drilling small, deep holes in electrically conductive materials. Shaped-tube electrolytic machining is a noncontact electrochemical-drilling process that distinguishes itself from all other drilling processes by its ability to produce holes with aspect ratios of up to 300:1. Being an electrochemical process, shaped-tube electrolytic machining is unaffected by either material hardness or toughness. It uses an acid-based electrolyte instead of the salt electrolytes normally incorporated in electrochemical machining. The use of acid electrolytes ensures that the metal sludge by-products from electrolytic deplating are dissolved and carried away as metal ions. This eliminates clogging of the electrolyte flow path around the electrode, an important feature when drilling deep holes. Shaped-tube electrolytic machining processes are discussed in more detail in *Machining Data Book*, vol. 2, pp. 11–71 to 11–75 (3rd ed. 1980); E. J. Weller, *Nontraditional Machining Processes*, pp. 109–13 (2nd ed. 1984); and G. F. Benedict, *Nontraditional Manufacturing Processes*, pp. 181–87 (1987).

Advances in jet engine technology have resulted in the need to machine super alloys and metals. The characteristics of these metals and the complex designs associated with jet engine hardware have posed machining problems which are beyond the capability of conventional machining processes. As a result, shaped-tube electrolytic machine processes have found particular applicability in the manufacture of aircraft engines. These processes are especially useful in drilling holes through turbine blades, buckets, vanes, and struts so that cooling liquid can be circulated through these components during turbine operation. Since such cooling is enhanced by turbulence within the cooling passages, there is little reason for finely machining these passages. Examples of the use of shaped-tube electrolytic machining processes in conjunction with aircraft engine manufacture are disclosed in U.S. Pat. Nos. 3,352,770 to Crawford et al., 3,352,958 to Andrews, 3,793,169 to Joslin, 3,805,015 to Andrews, and 4,088,557 to Andrews.

In recent years, shaped-tube electrolytic machining processes have also found application in the manufacture of precision extrusion dies for producing ceramic honeycomb structures. Such structures are particularly useful for automobile catalytic converters.

The manufacture of extrusion dies from these ultrahard materials is an extremely tedious process. The extrusion dies are formed with multiple apertures through which the extrudate is forced under high pressure. In one method of forming the extrusion die, mechanical drills are used to provide the extrusion apertures. If the extrusion dies are formed of ultra-hard materials such as, for example, 17-4PH stainless steel or Inconel ® 718 (a registered trademark of International Nickel Co., Inc.), the drilling rate used for aperture formation is very slow and a great deal of time and effort is expended in extrusion die formation. If softer die materials are used, the drilling rate is increased, but the life span of the resulting extrusion die is correspondingly shorter.

Because of these difficulties, apertures are now formed in extrusion dies by electrochemical machining techniques rather than mechanical drilling. With an electrochemical machining process, the workpiece from which the die is to be formed is situated in a fixed position relative to a movable manifold. The manifold supports a plurality of drilling tubes, each of which are utilized to form an aperture in the workpiece. The drilling tubes operate as cathodes in the electrochemical machining process, while the workpiece comprises the anode in that process. As the workpiece is flooded with an acid electrolyte from the manifold, material is selectively deplated from the workpiece in the vicinity of the drilling tubes to form the requisite aperture pattern. U.S. Pat. No. 4,687,563 to Hayes and European Patent Application Publication No. 0245 545 to Peters disclose such processes. Although this production technique has found significant usefulness in the art, the resulting extrusion dies can suffer from a problem of surface roughness in or near the holes.

In the use of shaped-tube electrolytic machining to manufacture extrusion dies, the presence of roughness in the passages of the dies is undesirable. Such roughness imparts friction against extrusion of material. These frictional forces are often so great that the ram for the extruder is unable to push material through the die. The present invention is directed to overcoming this problem.

SUMMARY OF THE INVENTION

The present invention relates to a shaped-tube electrolytic polishing process which involves providing a workpiece with at least one hole. The hole is polished by advancing a metal tube electrode through it while passing an electrolyte through the tube and into the hole and while passing an electric current between the tube and the workpiece through the electrolyte. As a result of the electrode's advancement through the hole, metal is deplated from the workpiece and the hole's surface roughness is reduced. Preferably, the hole is initially drilled in the workpiece by advancing a metal tube electrode toward and into the workpiece while passing an electrolyte through the tube and into contact with that workpiece and while passing electric current between the tube and the workpiece through the electrolyte. As a result, metal from the workpiece is deplated where the hole is being drilled.

DETAILED DESCRIPTION OF THE DRAWINGS AND THE INVENTION

Figure 1:
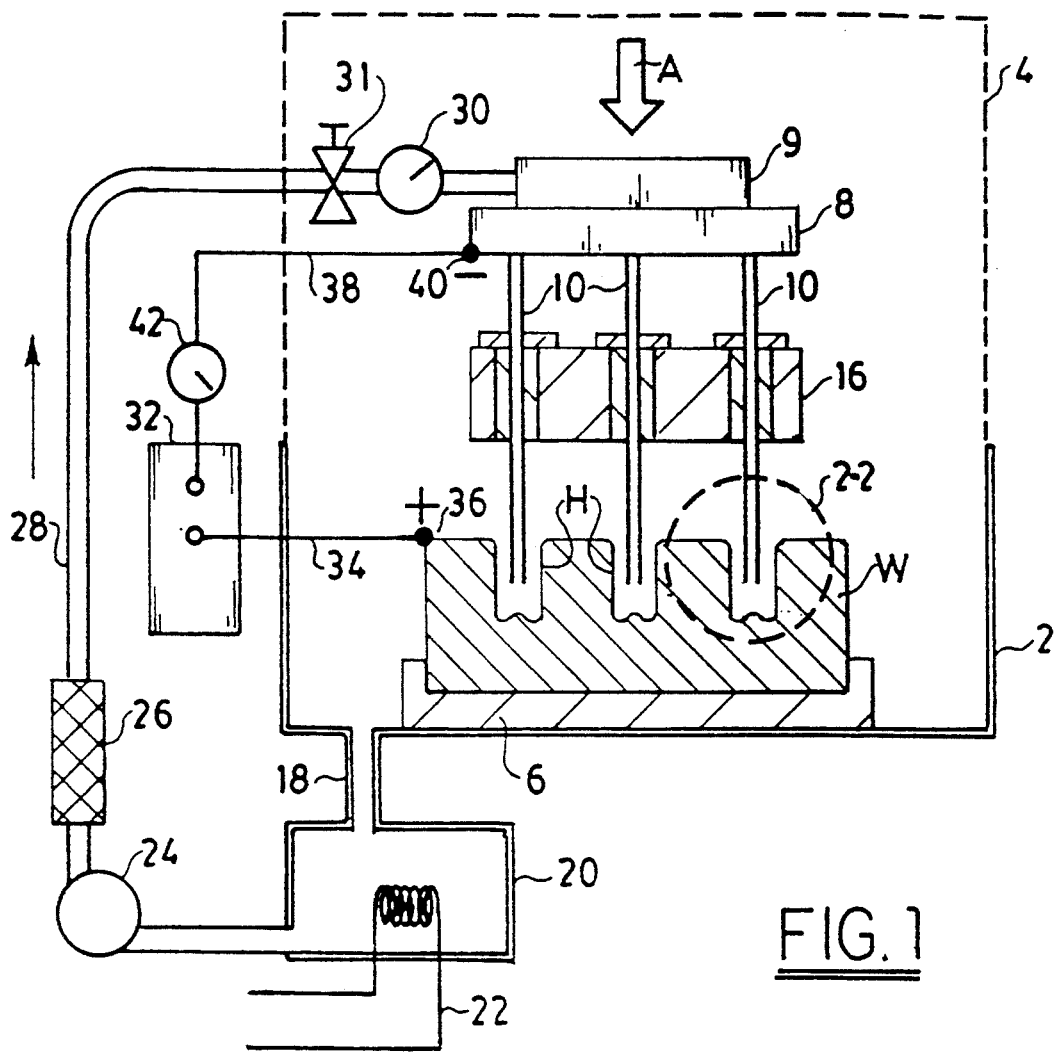
FIG. 1 is a schematic view of a shaped-tube electrolytic machining system.

FIG. 1 is a schematic view of a shaped-tube electrolytic machining system which is useful for sequentially carrying out the drilling and polishing steps of the present invention. The system includes a work enclosure formed by base 2 and cover 4. Positioned within the work enclosure is support 6 on which workpiece W rests. As illustrated, holes H are drilled in workpiece W by passing an electrolyte through feed manifold 9 into hollow tube electrodes 10. To achieve electrolytic machining, electrode holder 8 is provided with cathode contact 40 which is coupled to voltage source 32 by connector 38, having ammeter 42. Workpiece W is provided with anode contact 36 which is coupled to voltage source 32 by connector 34. As a result, electrolyte E discharged through hollow tube electrodes 10 deplates metal from workpiece W, forming holes H. This is shown in more detail in FIG. 2 which is an enlarged view of the portion of the system of FIG. 1 taken within circle 2—2. As illustrated, electrolyte E advances through the central passage defined by hollow tube electrode 10. At end 13 of hollow tube electrode 10, electrolyte E contacts workpiece W which increases the depth of hole H. Electrolyte E then advances upwardly out of hole H as shown by the arrows in FIG. 2. This flow of electrolyte E causes metal deplated from workpiece W within hole H to be carried out of the hole. In FIG. 1, stationary guideplate 16 is provided to align hollow tube electrodes 10 so that holes H in workpiece W are properly located.

Figure 2:
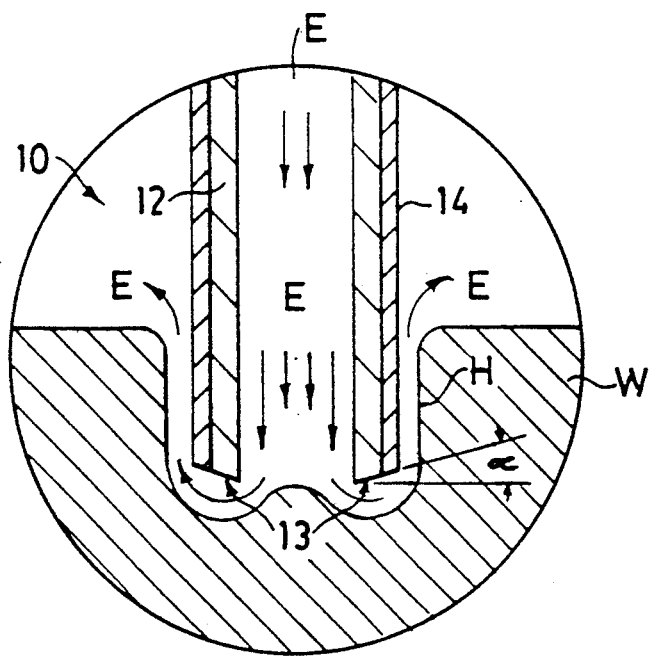
FIG. 2 is an enlarged view of a portion of the system of FIG. 1 taken within circle 2—2 of FIG. 1.

As also shown in FIG. 2, hollow tube electrode 10 includes metal tube 12 and a coating of dielectric material 14. End 13 of metal tube 12 is, however, not covered by dielectric material so that an electrolytic cell is formed between that portion of metal tube 12 and workpiece W. Generally, this portion of hollow tube electrode 10 is sloped such that angle $\alpha$ is preferably 11°. By coating metal tube 12 with dielectric material 14, metal ions present in electrolyte E after removal from workpiece W are prevented from depositing on hollow tube electrode 10 where it is coated. This coating also confines drilling to the area around end 13 of metal tube 12. Deposition can only take place on hollow tube electrode 10 where metal tube 12 is not coated with dielectric material 14. However, any deposits can be removed by periodically reversing the polarity of voltage source 32. Such polarity reversal of voltage source 32 is typically carried out for 0.05 to 3.0 sec. after 0.1-30 sec. of operation by hollow tube electrode 10.

Electrolyte E exiting from holes H in workpiece W drains into supply tank 20. Supply tank 20 is provided with heat exchanger 22 which heats or cools the electrolyte to maintain a desired temperature. Pump 24 is connected to supply tank 20 for recycling electrolyte through filter 26, feedpipe 28, pressure controller 31, and flow meter 30 into manifold 9.

In operation, the shaped-tube electrolytic machining system shown in FIG. 1 circulates electrolyte through the system until holes H of sufficient depth are formed in workpiece W. As hole H deepens, the structure formed by manifold 9, electrode holder 8, and hollow tube electrodes 10 is advanced toward workpiece W in the direction of arrow A by a constant feed servosystem (not shown). As a result, ends 13 of hollow tube electrodes 10 are maintained in a position suitable for optimal deplating of metal from workpiece W. Generally, the rate at which these components are advanced along the path defined by arrow A is substantially equal to the rate at which the workpiece material is dissolved. The system of FIG. 1 is provided with a mechanism (not shown), as is well known in the art, to control operation of voltage source 32, the constant feed servosystem, and the electrolyte circulating system.

The shaped-tube electrolytic machining process of the present invention can be used to drill holes in a variety of conductive materials, such as 304 stainless steel, 321 stainless steel, 414 stainless steel, inconel alloy 718, inconel alloy 625, inconel alloy X-750, and inconel alloy 825. Holes as deep as 610 millimeters can be produced with length-to-diameter (i.e. aspect) ratios of up to 300:1 and diameters ranging from 0.5 to 6.4 millimeters. Oval and other shapes should have a minimum width of 0.5 millimeters and a major-to-minor axis ratio of 3:1.

The electrolyte is a solution which contains an acid selected from the group consisting of nitric acid, sulfuric acid, hydrochloric acid, and mixtures thereof. Generally, the electrolyte has a volumetric acid concentration of 16-18 vol. %. The electrolyte is applied to workpiece W at a temperature of 18°-32° C. due to the effect of heat exchanger 22 and at a pressure of 344-551 KPA which is imparted by the discharge pressure from pump 24, as regulated by pressure controller 31. The content of metal particles in the electrolyte is a maximum of 45-2500 milligrams per liter. Generally, conductivity increases with the concentration of metal and acid in the electrolyte. Higher acid concentrations result in increased metal removal from workpieces; however, accelerated chemical attack on the electrodes may occur. Increased concentration of acid in the electrolyte also increases the hole size. Increases in electrolyte temperature have the same effect as concentration increases.

Voltage source 32 is generally a direct current power supply. It has a voltage of 1-15 volts, a forward on time of 0.1-30 seconds, and a reverse time of 0.05-3 seconds. Generally, the cross-sectional area of the hole being drilled becomes larger as voltage increases. However, it is not desirable to operate at the upper limit of the voltage range, because the resulting heat generated may damage the coating of dielectric material 14 and will accelerate the build up of metal ions on the electrode.

Hollow tube electrodes 10 are generally fabricated from titanium because of its resistance to electrolytic action. The layer of dielectric material 14 must also be smooth, have an even thickness, be concentric with the tube, be tightly adhered to metal tube 12, and be free of pin holes or foreign material. Straightness is essential to achieve satisfactory hole quality. Suitable dielectric materials include polyethylene, polytetrafluoroethylene, ceramics, and rubbers. A particularly preferred dielectric coating material is ALKANEX ™.

Generally, the process of the present invention involves two stages—i.e., drilling holes in a workpiece and then polishing the drilled holes. During the hole drilling phase of the process, holes are preferably formed in a solid workpiece like that of workpiece W in FIG. 1 by the process described above. After holes H of suitable length are formed in workpiece W, a constant feed servosystem (not shown) withdraws the portion of the apparatus constituted by feed manifold 9, electrode holder 8, and hollow tube electrodes 10 away from workpiece W and out of holes H. As a result of the drilling process, holes H have a surface roughness of 0.8-1.0 μm. This is accomplished with a drilling speed (i.e., a rate at which hollow tube electrodes 10 advance into holes H) of 0.4-5.0 mm per minute.

The surfaces of holes H can be smoothed by the subsequent step of polishing. This involves, again, advancing manifold 9, electrode holder 8, and hollow tube electrodes 10 back into holes H using the constant feed servosystem (not shown), while feeding electrolyte E from manifold 9, through hollow tube electrodes 10, and into holes H. Electrolyte E is then withdrawn through tube 18 into supply tank 20 and recycled by pump 24 through filter 26, feed pipe 28, pressure controller 31, and flow meter 30. During this time, voltage source 32 forms an electrochemical cell through anode contact 36 and cathode contact 40.

The chief distinction between the drilling step and the polishing step is the speed at which the constant feed servosystem advances manifold 9, electrode holder 8, and hollow tube electrodes 10 into holes H. Specifically, the polishing speed is 12-36 mm per minute, while, as noted above, the drilling speed is 0.4-5.0 mm per minute. Thus, the ratio of the drilling speed through workpiece W to the polishing speed through workpiece W is about 1:2.5 to 1:25. As a result of the polishing step, the surface roughness of hole H after polishing is 0.4-0.5 μm. Such enhanced smoothness is sufficient to permit extrusion of material through dies prepared in accordance with this process.

EXAMPLES

Example 1

Using a shaped-tube electrolytic machining apparatus like that shown in FIG. 1, two pieces of 6.35 millimeters × 29.083 millimeters × 203.2 millimeters USN #S45000 stainless steel clamped together were drilled with a 1.448 mm test hole through their mating surfaces. Such drilling was carried out at 9 volts, 165 amps, an electrode feed rate of 0.889 mm per minute, and an electrolyte pressure of 448 KPA. After drilling was completed, the two pieces were separated and measured for surface roughness. It was found that the portion of the holes which had been drilled but not polished had an average surface roughness of 0.787 to 0.862 micrometers, measured with a Perthen Model S6P Perthometer, available from Feinpruef Corp., Charlotte, N.C. After such measurements were made, the pieces were clamped for polishing.

A portion of the drilled hole was polished by passing the electrode of the shaped-tube electrolytic machining apparatus partially into the previously-drilled hole. During this procedure, that apparatus was operated at 9 volts, 165 amps, an electrode feed rate of 25.4 μm per minute, and an electrolyte pressure of 448 KPA. After polishing was completed, the pieces were unclamped and the surface roughness of the portion of the hole which had been both drilled and polished was measured and found to have a value of 0.337 to 0.375 micrometers. Thus, the polishing step of the present invention significantly reduced the surface roughness of the previously-drilled hole.

Figure 3:
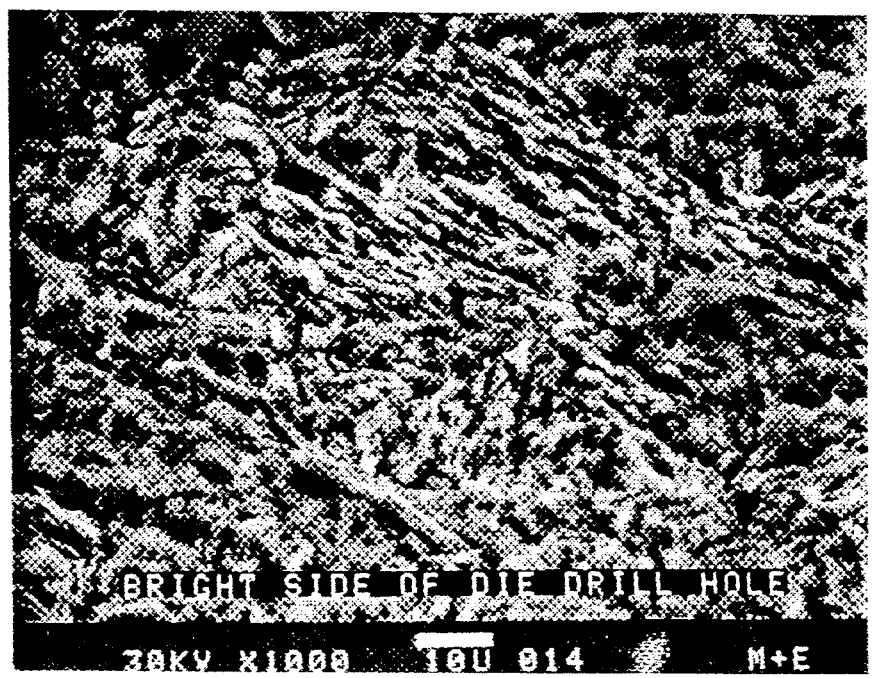
FIG. 3 is an electron microscopic photograph, at a 1000x magnification, of a hole that has been drilled but not polished in accordance with a prior art process.
Figure 4:
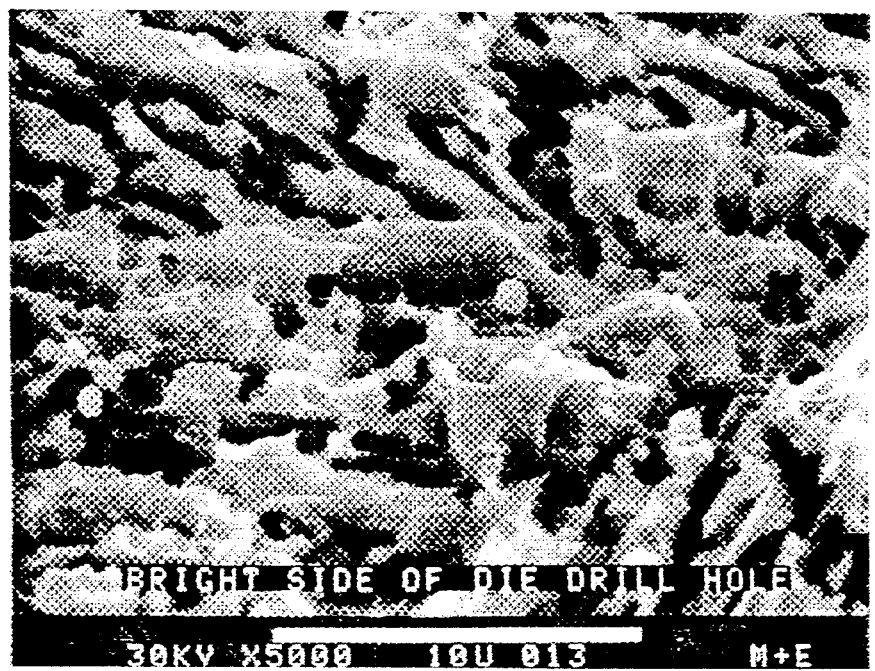
FIG. 4 is an electron microscopic photograph of the subject matter of FIG. 3 at a 5000x magnification.
Figure 5:
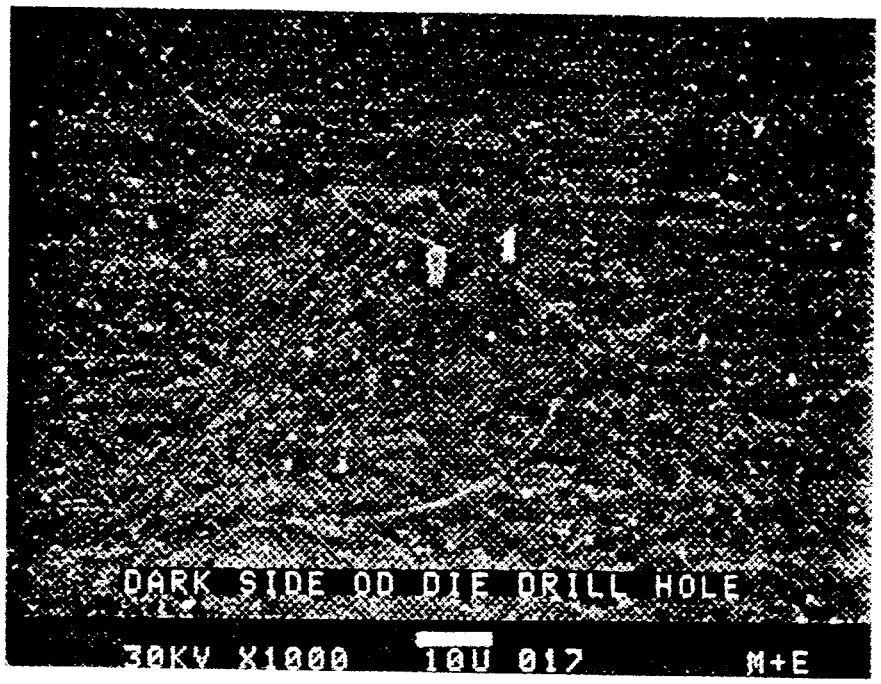
FIG. 5 is an electron microscopic photograph, at a 1000x magnification, of a hole that has been drilled and polished in accordance with the present invention.
Figure 6:
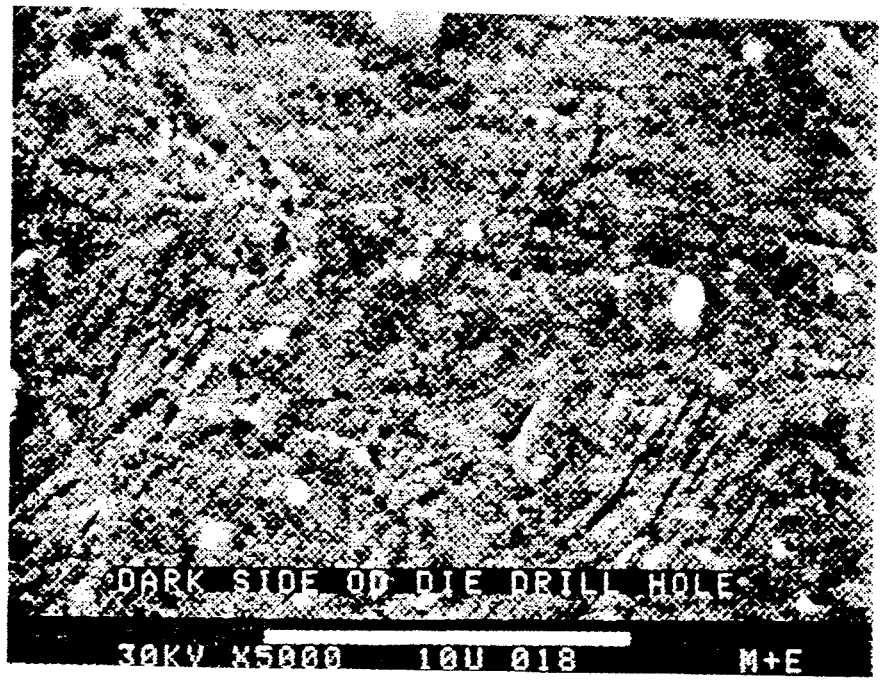
FIG. 6 is an electron microscopic photograph of the subject matter of FIG. 5 at a 5000x magnification.

Using a scanning electron microscope, photographs were made of the portions of the hole which had been drilled only and which had been both drilled and polished. FIG. 3 is an electron microscopic photograph, at a 1000x magnification, of the hole which had been only drilled. FIG. 4 is an electron microscopic photograph of the subject matter of FIG. 3 at a 5000x magnification. FIG. 5 is an electron microscopic photograph, at a 1000x magnification, of the portion of the hole that had been both drilled and polished in accordance with the present invention. FIG. 6 is an electron microscopic photograph of the subject matter of FIG. 5 at a 5000x magnification.

Examples 2-14

Holes were drilled in test pieces like that described in Example 1 using the drilling equipment and parameters set forth in that example. After the pieces were unclamped, they were measured for surface roughness, as described in Example 1, and found to have surface roughness values of 0.787 to 0.862 micrometers.

After the test pieces were reclamped, they were polished by passing the electrode of the shaped-tubed electrolytic machining apparatus through the previously-drilled hole. This procedure was carried out under the conditions set forth below in Table I. The surface roughness of the polished holes was then determined as set forth in Example 1. The results of these measurements are in Table I.

TABLE I

| Example | Voltage (Volts) | Amperage (Amps) | Electrode Feed Rate (millimeters per minute) | Electrolyte Pressure (KPA) | Surface Roughness (micrometers) |
|---|---|---|---|---|---|
| 2 | 9 | 170 | 25.4 | 448 | 0.3375-0.375 |
| 3 | No Data | | | | |
| 4 | 9 | 150 | 25.4 | 448 | 0.375-0.450 |
| 5 | 10 | 170 | 38.1 | 448 | 0.375-0.487 |
| 6 | 12 | 200 | 26.03 | 448 | 0.3375-0.412 |
| 7 | 9 | 150 | 20.32 | 448 | 0.375-0.487 |
| 8 | 9 | 150 | 25.4 | 448 | 0.3375-0.375 |
| 9 | 9 | 150 | 20.32 | 448 | 0.300-0.3375 |
| 10 | 9 | 140 | 25.4 | 448 | 0.375 |
| 11 | 9 | 130 | 25.4 | 448 | 0.375-0.487 |
| 12 | 9 | 130 | 25.4 | 517 | 0.412-0.475 |
| 13 | 9 | 50 | 25.4 | 448 | 0.675-0.750 |
| 14 | 9 | 150 | 25.4 | 448 | 0.262-0.375 |

The surface roughness values set forth in Table I again demonstrate that the polishing process of the present invention significantly reduces the surface roughness of holes initially drilled with the shaped-tube electrolytic machining equipment.

Examples 15-17

Clamped test pieces like those used in Example 1 were drilled with a shaped-tube electrolytic machining apparatus like that disclosed in Example 1 where drilling was carried out at 8 volts, 165 amps, an electrode feed rate of 0.889 mm per minute, and an electrolyte pressure of 448 KPA. After drilling was completed, the clamped pieces were separated and their surface roughness measured using the equipment described in Example 1. As a result, it was found that the drilled holes had a surface roughness of 0.787 to 0.862 micrometers.

After the pieces were reclamped, the drilled holes were polished by passing the electrode of the shaped-tube electrolytic drilling apparatus through the previously-drilled holes under the operating conditions set forth below in Table II. The polished holes were then measured for surface roughness, as described in Example 1, and found to have those values set forth in Table II.

TABLE II

| Example | Voltage (Volts) | Amperage (Amps) | Electrode Feed Rate (millimeters per minute) | Electrolyte Pressure (KPA) | Surface Roughness (micrometers) |
|---|---|---|---|---|---|
| 15 | 8 | — | 38.1 | 448 | 0.325–0.375 |
| 16 | 8 | — | 38.1 | 448 | 0.412–0.600 |
| 17 | 8 | 160 | 38.1 | 448 | 0.412–0.525 |

The data for Examples 15–17 thus again demonstrate the improved surface roughness achieved with the polishing processes of the present invention.

Although the invention has been described in detail for the purpose of illustration, it is understood that such detail is solely for that purpose, and variations can be made therein by those skilled in the art without departing from the spirit and scope of the invention which is defined by the following claims.

What is claimed:

1. A shaped-tube electrolytic polishing process comprising:
   providing a conductive workpiece with at least one hole and
   polishing the at least one hole by advancing a metal tube electrode through the hole while passing an electrolyte through the tube and into the hole and while passing electric current between the tube and the workpiece through the electrolyte, whereby said polishing deplates metal from the workpiece and imparts reduced surface roughness to the hole.

2. A process according to claim 1, wherein said providing a metal workpiece comprises:
   drilling a hole in a metal workpiece by advancing a metal tube electrode against the workpiece while passing an electrolyte through the tube and into contact with the workpiece and while passing electric current between the tube and the workpiece through the electrolyte, whereby metal from the workpiece is deplated where the hole is being drilled.

3. A process according to claim 2, wherein the ratio of drilling speed through the workpiece to polishing speed through the workpiece is 1:2.5 to 1:25.

4. A process according to claim 3, wherein the drilling speed is 0.4 to 5.0 mm/min.

5. A process according to claim 3, wherein the polishing speed is 12–36 mm/min.

6. A process according to claim 2, wherein the hole has a surface roughness of 0.4 to 0.5 μm after said polishing.

7. A process according to claim 2, wherein the hole has a surface roughness of 0.8 to 1.0 μm after said drilling.

8. A process according to claim 2, wherein the electrolyte for said polishing and said drilling contains an acid selected from the group consisting of nitric acid, sulfuric acid, hydrochloric acid, and mixtures thereof.

9. A process according to claim 8, wherein the electrolyte has a volumetric acid concentration of 16–18 vol. %.

10. A process according to claim 8, wherein the electrolyte has a temperature of 18°–32° C. during said polishing and said drilling.

11. A process according to claim 2 further comprising:
   reversing periodically the voltage source polarity during said polishing and said drilling to prevent buildup of deplated metal on the metal tube electrode.

12. A process according to claim 2, wherein the metal tube electrode is exteriorly coated with a dielectric material except at its end where the electrolyte is discharged against the workpiece.

13. A process according to claim 2, wherein the hole has a length to diameter ratio of up to 300:1.

14. A process according to claim 2 further comprising:
   collecting the electrolyte after it has contacted the workpiece during said polishing and said drilling.

15. A process according to claim 14 further comprising:
   recycling the collected electrolyte to the metal tube electrode for reuse during said polishing and said drilling.

16. A process according to claim 15 further comprising:
   filtering the electrolyte during said recycling.

17. A process according to claim 2, wherein said workpiece has a plurality of holes.

18. A process according to claim 17, wherein said workpiece has a hole configuration of an extrusion die suitable for use in extruding ceramic honeycomb materials.

19. A process according to claim 1, wherein the polishing is at a speed of 12 to 36 mm/min.

20. A process according to claim 1, wherein the hole has a surface roughness of 0.4 to 0.5 μm after said polishing.

* * * * *